United States Patent
Alev et al.

(10) Patent No.: US 8,083,895 B2
(45) Date of Patent: *Dec. 27, 2011

(54) SHEET STABILIZATION WITH DUAL OPPOSING CROSS DIRECTION AIR CLAMPS

(75) Inventors: Tamer Mark Alev, Vancouver (CA); Glen John Visser, North Vancouver (CA); Salvatore Chirico, Port Moody (CA); Ron Beselt, Burnaby (CA); Michael Kon Yew Hughes, Vancouver (CA)

(73) Assignee: Honeywell ASCa Inc., Mississauga (CA)

( * ) Notice: Subject to any disclaimer, the term of this patent is extended or adjusted under 35 U.S.C. 154(b) by 556 days.

This patent is subject to a terminal disclaimer.

(21) Appl. No.: 12/106,247

(22) Filed: Apr. 18, 2008

(65) Prior Publication Data

US 2009/0260772 A1     Oct. 22, 2009

(51) Int. Cl.
*B65H 23/24* (2006.01)
*B65H 20/10* (2006.01)
*B65H 29/18* (2006.01)
*D21F 1/42* (2006.01)
*D21F 7/06* (2006.01)
*D21G 9/00* (2006.01)
*G01B 11/06* (2006.01)

(52) U.S. Cl. ......... 162/263; 162/289; 226/97.3; 34/114; 406/88; 700/127

(58) Field of Classification Search ............ 162/193, 162/198, 199, 202, 263, 272, 275, 289; 226/7, 226/97.3; 34/114–122; 406/88, 197; 700/127–129
See application file for complete search history.

(56) References Cited

U.S. PATENT DOCUMENTS

| 3,385,490 | A | * | 5/1968 | Malmgren et al. ............ 226/7 |
| 3,549,070 | A | * | 12/1970 | Downham et al. ...... 242/615.11 |
| 3,587,177 | A | | 6/1971 | Overly |
| 3,678,599 | A | * | 7/1972 | Vits ............................ 34/641 |
| 3,763,571 | A | * | 10/1973 | Vits ............................ 34/641 |
| 3,873,013 | A | * | 3/1975 | Stibbe .................... 242/615.11 |
| 4,074,841 | A | * | 2/1978 | Kramer et al. ............ 226/97.3 |
| 4,137,644 | A | * | 2/1979 | Karlsson ...................... 34/460 |
| 4,201,323 | A | * | 5/1980 | Stibbe et al. ............ 242/615.11 |
| 4,252,512 | A | | 2/1981 | Komylal |
| 4,271,601 | A | * | 6/1981 | Koponen et al. ............. 34/641 |
| 4,336,017 | A | | 6/1982 | Desty |
| 4,601,116 | A | | 7/1986 | Krimsky |

(Continued)

FOREIGN PATENT DOCUMENTS

DE     3630571 A1    3/1987

(Continued)

*Primary Examiner* — Jose A Fortuna
(74) *Attorney, Agent, or Firm* — Cascio Schmoyer & Zervas

(57) ABSTRACT

An air stabilization system employing two parallel, opposite facing Coanda nozzles, that are positioned adjacent a flexible moving web, with each nozzle exhausting gas at opposite directions, subjects the moving web to opposing forces effective to stabilize the web. Each nozzle includes an elongated slot that is parallel to the path of the moving web. The two Coanda nozzles serve as separate points along the machine direction for controlling the height of the moving web. By modulating the flow, pressure and other parameters of gases exiting the Coanda nozzles, the shape of the moving web between the nozzles can be manipulated to present a planar contour for measurements. The air stabilization system can be incorporated into a scanner head to measure the caliper of paper, plastic, and other flexible web products.

16 Claims, 3 Drawing Sheets

U.S. PATENT DOCUMENTS

| | | | |
|---|---|---|---|
| 4,678,915 A | 7/1987 | Dahlquist | |
| 4,879,471 A | 11/1989 | Dahlquist | |
| 4,932,140 A * | 6/1990 | Lepisto | 34/641 |
| 5,014,447 A * | 5/1991 | Hagen | 34/641 |
| 5,067,509 A | 11/1991 | Hunter | |
| 5,094,535 A | 3/1992 | Dahlquist | |
| 5,156,312 A * | 10/1992 | Kurie | 242/615.11 |
| 5,166,748 A | 11/1992 | Dahlquist | |
| 5,299,364 A * | 4/1994 | Heikkila et al. | 34/460 |
| 5,355,083 A | 10/1994 | George | |
| 5,395,029 A * | 3/1995 | Kurie | 242/615.11 |
| 5,471,766 A * | 12/1995 | Heikkila et al. | 34/461 |
| 5,829,166 A * | 11/1998 | Klas | 34/641 |
| 6,003,750 A * | 12/1999 | Hermsen | 226/91 |
| 6,155,518 A * | 12/2000 | Bannenberg | 242/615.11 |
| 6,193,810 B1 | 2/2001 | Baum | |
| 6,281,679 B1 | 8/2001 | King | |
| 6,543,765 B2 | 4/2003 | Kerpe et al. | |
| 6,743,338 B2 | 6/2004 | Graeffe | |
| 6,936,137 B2 | 8/2005 | Moeller | |
| 6,967,726 B2 | 11/2005 | King | |
| RE39,601 E * | 5/2007 | Svanqvist et al. | 162/193 |
| 7,530,179 B2 * | 5/2009 | Rocheleau | 34/640 |
| 7,892,399 B2 * | 2/2011 | Graham et al. | 162/193 |
| 2003/0075293 A1 * | 4/2003 | Moeller et al. | 162/193 |
| 2008/0136091 A1 * | 6/2008 | Shakespeare | 271/227 |
| 2009/0260771 A1 * | 10/2009 | Alev et al. | 162/207 |
| 2009/0260772 A1 * | 10/2009 | Alev et al. | 162/207 |
| 2009/0294084 A1 * | 12/2009 | Duck et al. | 162/202 |
| 2010/0078140 A1 * | 4/2010 | Hughes | 162/202 |

FOREIGN PATENT DOCUMENTS

| | | |
|---|---|---|
| EP | 0096532 A2 | 12/1983 |
| EP | 1273879 A2 | 1/2003 |
| GB | 2146303 A * | 4/1985 |
| JP | 6031407 A | 2/1994 |
| WO | WO 2009129056 A1 * | 10/2009 |
| WO | WO 2009148852 A2 * | 12/2009 |
| WO | WO 2010036546 A1 * | 4/2010 |

* cited by examiner

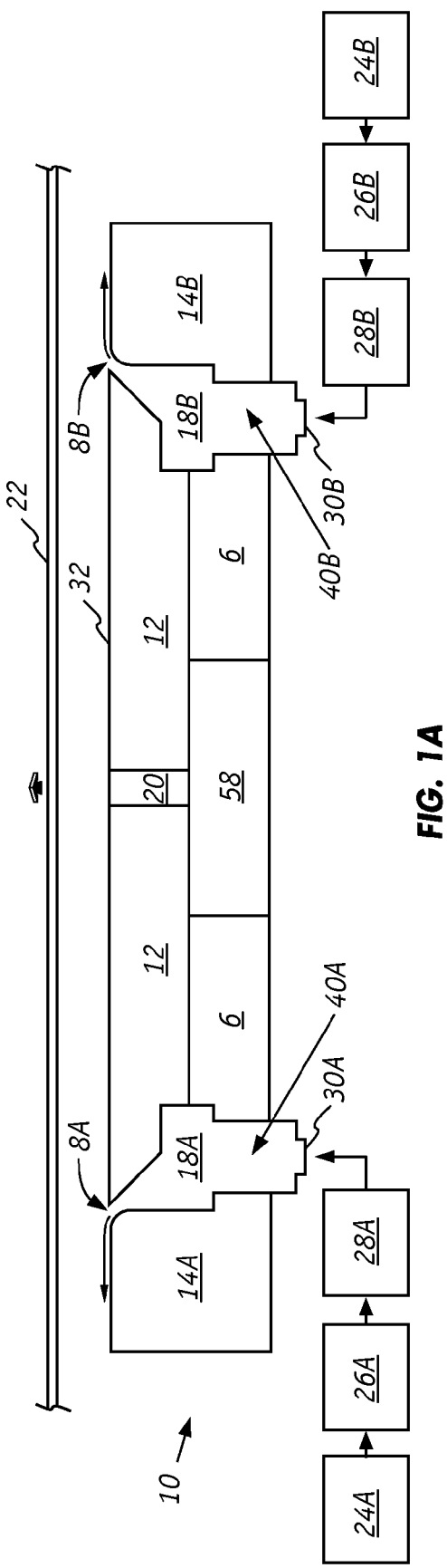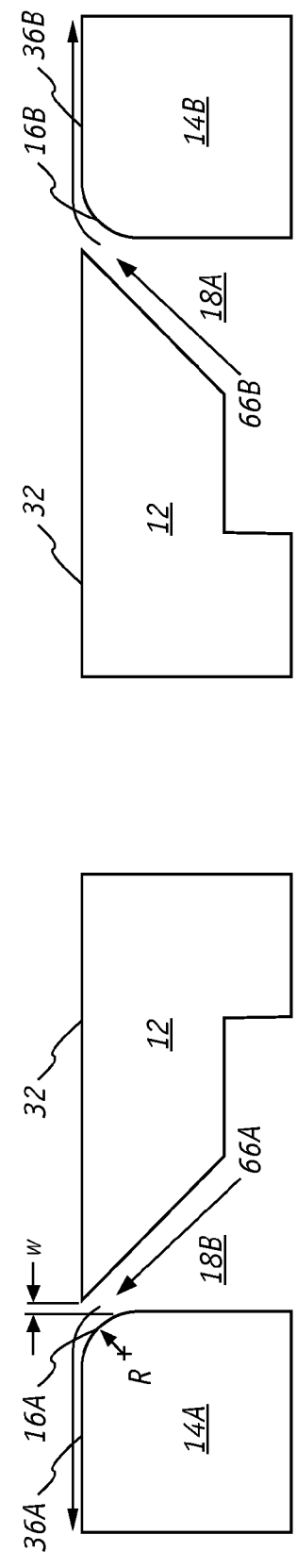

SHEET STABILIZATION WITH DUAL OPPOSING CROSS DIRECTION AIR CLAMPS

FIELD OF THE INVENTION

The present invention relates generally to an air stabilizer device for non-contacting support of a moving flexible continuous web of material that is moving in the machine direction. The air stabilizer employs two opposite-facing nozzles that serve as air clamps to stabilize the moving web. Each nozzle comprises an elongated slot that extends along the machine direction so as to be parallel to the direction of movement of the web. By regulating the flow of the two jets of gas that are exhausted from the opposite-facing nozzles, the profile of the web as it passes over the air stabilizer can be controlled.

BACKGROUND OF THE INVENTION

In the manufacture of paper on continuous papermaking machines, a web of paper is formed from an aqueous suspension of fibers (stock) on a traveling mesh papermaking fabric and water drains by gravity and suction through the fabric. The web is then transferred to the pressing section where more water is removed by pressure and vacuum. The web next enters the dryer section where steam heated dryers and hot air completes the drying process. The paper machine is, in essence, a water removal system. A typical forming section of a papermaking machine includes an endless traveling papermaking fabric or wire, which travels over a series of water removal elements such as table rolls, foils, vacuum foils, and suction boxes. The stock is carried on the top surface of the papermaking fabric and is de-watered as the stock travels over the successive de-watering elements to form a sheet of paper. Finally, the wet sheet is transferred to the press section of the papermaking machine where enough water is removed to form a sheet of paper.

It is well known to continuously measure certain properties of the paper material in order to monitor the quality of the finished product. These on-line measurements often include basis weight, moisture content, and sheet caliper, i.e., thickness. The measurements can be used for controlling process variables with the goal of maintaining output quality and minimizing the quantity of product that must be rejected due to disturbances in the manufacturing process. The on-line sheet property measurements are often accomplished by scanning sensors that periodically traverse the sheet material from edge to edge. It is conventional to measure the caliper of sheet material upon its leaving the main dryer section or at the take-up reel with scanning sensors, as described, for example, in U.S. Pat. No. 6,967,726 to King et al. and U.S. Pat. No. 4,678,915 to Dahlquist et al.

In order to precisely measure some of the paper's characteristics, it is essential that the fast moving sheet of paper be stabilized at the point of measurement to present a consistent profile since the accuracy of many measurement techniques requires that the web stay within certain limits of flatness, height variation and flutter. U.S. Pat. No. 6,743,338 to Graeffe et al. describes a web measurement device having a measurement head with a reference surface that includes a plurality of holes formed therein. The reference part is configured so that there is an open space or channel below the reference part. By generating a negative pressure in the open space, suction force is exerted on the web to causes it be supported against the reference surface substantially over the entire measuring area. With such contacting methods, debris and contaminants tend to build on the sensing elements which adversely affect the accuracy of the measuring device. Moreover, to avoid paper degradation, stabilization must be accomplished without contact to the stabilizing device. This is critical at the high speed at which web material such as paper is manufactured.

U.S. Pat. No. 6,281,679 to King et al. describes a non-contact web thickness measurement system which has dual sensor heads each located on opposite sides of a moving web. The system includes a web stabilizer that is based on a vortex of moving air and includes a clamp plate that is mounted near the web, which is to be stabilized, and a circular air channel within the clamp plate that is coincident with its upper surface. When air is introduced into the circular air channel, a field of low pressure is created over the channel and the web is pulled toward this ring of low pressure. While these vortex-type air clamps do provide adequate air bearing support they also create a "sombrero-type" profile on the web material in the center of its effective region, thus they do not generate a sufficiently flat profile for measurements. In measuring paper thickness, it has been found that this stabilizer system does not produce a sufficiently planar sheet profile.

U.S. Pat. No. 6,936,137 to Moeller et al. describes a linear air clamp or stabilizer, for supporting a moving web, which employs a single Coanda nozzle in conjunction with a "backstep" which is a depression downstream from the nozzle. As the web moves downstream over the air stabilizer, a jet of gas is discharged from the nozzle in a downstream direction that is parallel to the movement of the web. With this stabilizer, a defined area of web material rides on an air bearing as the web passes over the air clamp surface where a thickness measurement device is positioned.

When employed in a papermaking machine, a non-contacting caliper sensor is particularly suited for measuring the thickness of the finished paper near the take-up reel. The heads of the sensor are positioned on a scanner system that generally includes a pair of horizontally extending guide tracks that span the width of the paper. The guide tracks are spaced apart vertically by a distance sufficient to allow clearance for paper to travel between the tracks. The upper head and lower head are each secured to a carriage that moves back-and-forth over paper as measurements are made. The upper head includes a device that measures the height between the upper head and the upper surface of the web and the lower head includes a device that measures the height between the lower head to the lower surface of the web.

The lower head includes an air stabilizer to support the moving paper. Ideally, the interrogations spots of each laser triangulation device are directly above each other. Accurate and precise measurements are attained when the two heads are in alignment but scanner heads will deviate from perfect alignment over time. A caliper sensor with misaligned sensor heads will not accurately measure a sheet that is not flat and current air stabilizers do not adequately support the moving sheet to present a sufficiently flat profile for measurement.

SUMMARY OF THE INVENTION

The present invention is based in part on the development of an air stabilization system that subjects a moving flexible web, which is traveling in the machine direction, to opposing suction and shear forces sufficient to stabilize the web. This can be achieved by employing two preferably parallel, opposite facing elongated Coanda nozzles below the moving web with each nozzle exhausting gas at opposite cross directions. Each nozzle includes an elongated slot that is parallel to the path of the moving web. The locations of the two Coanda nozzles serve as separate positions on the machine direction for controlling the height of the moving web. By regulating the flow, speed, pressure or other parameters of the jets exiting the nozzles, the contour of the web can be manipulated to exhibit a planar contour between two the Coanda nozzles to enable accurate thickness and other measurements. The air stabilization system's clamping capacity can be improved by increasing the air pressures, velocities or other parameters of the two exhausting gases which increases the tension on the web.

In one aspect, the invention is directed to an air stabilization system for non-contact support of a flexible continuous web that is moving in a downstream machine direction (MD) that includes:
   (a) a body having an operative surface facing the web wherein the operative face has a web entry end and a web exit end that is downstream from the web entry end;
   (b) a first nozzle, positioned on the operative surface, that defines a first slot that extends across the surface of the operative surface along the MD and wherein a first elongated jet of pressurized gas is exhausted through the first slot and moves toward a first downstream cross direction (CD) to impart a first controlled force on the web; and
   (c) a second nozzle, positioned on the operative surface, that defines a second slot that extends across the surface of the operative surface along the MD, wherein a second elongated jet of pressurized gas is simultaneously exhausted through the second slot and moves toward a second downstream CD to impart a second controlled force on the web, wherein the direction of the first downstream CD is opposite to that of the second downstream CD and whereby the first force and the second force maintain at least a portion of the moving web, that is located between the web entry end and the web exit end, at a substantially fixed distance to the operative surface.

In another aspect, the invention is directed to a method of non-contact support of a flexible continuous web that is moving in a downstream machine direction (MD) along a path that includes the steps of:
   (a) positioning an air stabilizer below the continuous web along the path wherein the stabilizer includes:
      (i) a body having an operative surface facing the web wherein the operative face has a web entry end and a web exit end that is downstream from the web entry end;
      (ii) a first nozzle, positioned on the operative face, that defines a first slot that extends across the surface of the operative surface along a cross direction (CD), wherein the first nozzle is in fluid communication with a first source of gas; and
      (iii) a second nozzle, positioned on the operative face, that defines a second slot that extends across the surface of the operative surface along the CD wherein the second nozzle is in fluid communication with a second source of gas;
   (b) directing a first jet of gas from the first slot toward a first downstream cross direction (CD) to impart a first force on the continuous web; and
   (c) simultaneously directing a second jet of gas from the second slot toward a second downstream CD to impart a second force on the continuous web, wherein the direction of the first downstream CD is opposite that of the second stream CD, whereby the first force and the second force maintain at least a portion of the moving web, that is located between the web entry end and the web exit end, at a substantially fixed distance to the operative surface.

In a further aspect, the invention is directed to a system for monitoring a flexible continuous web that is moving in a downstream machine direction (MD) that includes:

(a) an air stabilization system for non-contact support of the flexible continuous web, which has a first surface and a second surface, that includes:
      (i) a body having an operative surface facing the web wherein the operative face has a web entry end and a web exit end that is downstream from the web entry end;
      (ii) a first nozzle, positioned on the operative face, that defines a first slot that extends across the surface of the operative surface along a MD and wherein a first elongated jet of pressurized gas is exhausted through the first slot and moves toward a first downstream CD to impart a first controlled force on the web; and
      (iii) a second nozzle, positioned on the operative face, that defines a second slot that extends across the surface of the operative surface along the MD, wherein a second elongated jet of pressurized gas is simultaneously exhausted through the second slot and moves toward a second downstream machine direction to impart a second controlled force on the web, wherein the direction of the first downstream CD is opposite to that of the second downstream CD and whereby the first force and the second force maintain at least a portion of the moving web, that is located between the web entry end and the web exit end, at a substantially fixed distance to the operative surface;
   (b) a first sensor head that is disposed adjacent the first surface of the web; and
   (c) means for regulating the first jet of gas and the second jet of gas to control the web's profile along the process path over the operative surface.

BRIEF DESCRIPTION OF THE DRAWINGS

FIG. 1A is a cross sectional view of an embodiment of the air stabilizer system;

FIGS. 1B and 1C are enlarged partial cross sectional views of Coanda nozzles;

DESCRIPTION PREFERRED EMBODIMENTS

Figure 2:
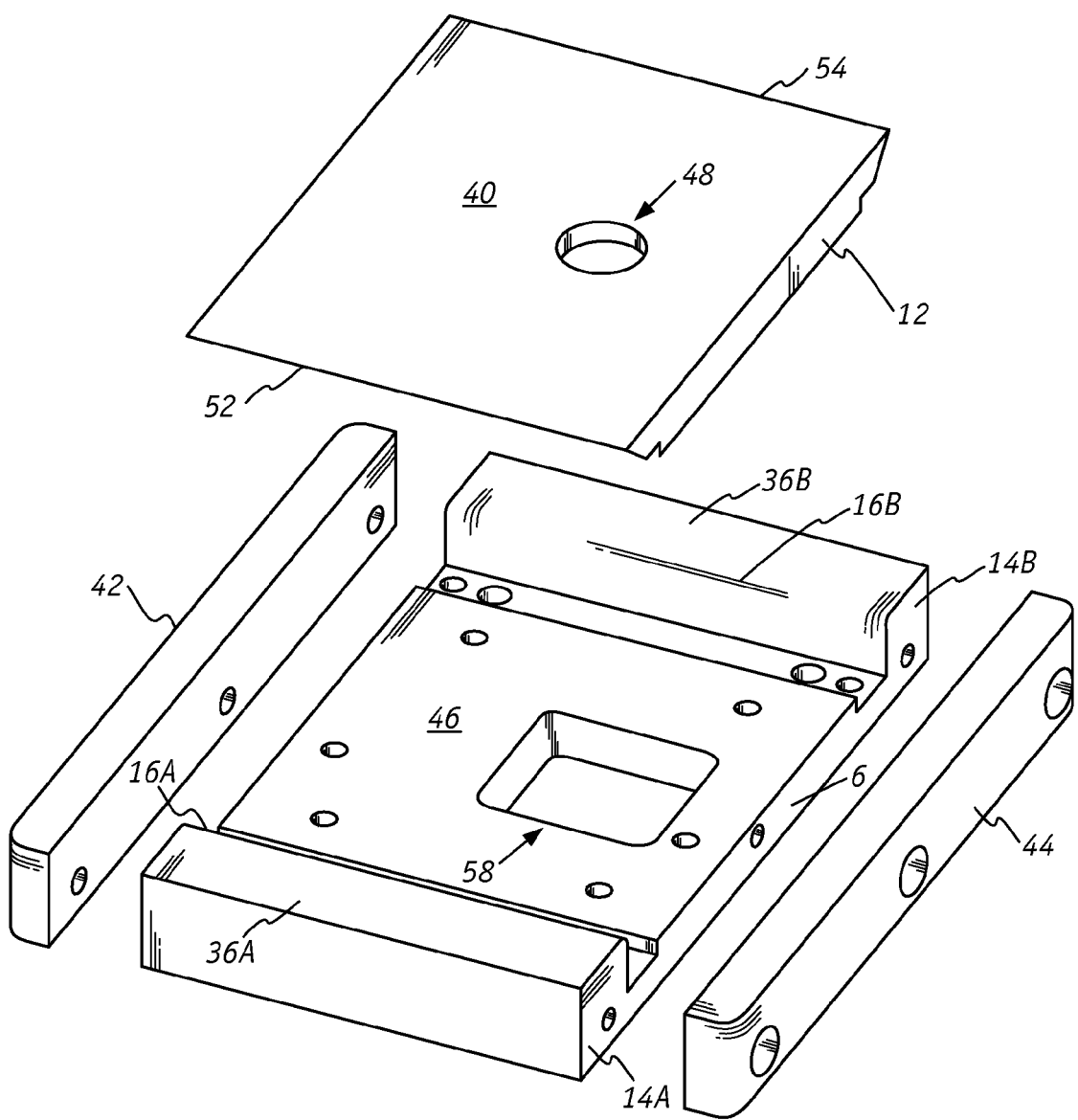
FIG. 2 is a perspective view of the air stabilizer system in dissembled form.

FIG. 1A illustrates an embodiment of an air stabilization system 10 that includes a stainless steel body that features dual Coanda nozzles which exhaust streams of gases in opposition cross directions. The body is segmented into a central region 12, lateral region 14A and lateral region 14B. The central region has an operative surface 32 that is situated between Coanda nozzles 8A and 8B. A sensor device 20 has an upper surface that is flush with operative surface 32 and is part of the operative surface 32. The upper surface of lateral region 14A, the upper surface of lateral region 14B and operative surface 32 are coplanar.

The body further includes a lower middle portion 6 which supports central region 12. Aperture 58 permits access to sensor device 20. The air stabilization system 10 is positioned underneath a web of material 22 which is moving in a machine direction (MD) that is perpendicular relative to the system; this direction being referred to as the downstream MD and the opposite direction being the upstream MD. The cross direction (CD) is transverse to the MD.

As further described herein, the contour of web 22 as it travels over operative surface 32 can be controlled with the air stabilization system. In a preferred application of the air stabilization system, the profile of web 22 is substantially planar. Furthermore, the vertical height between web 22 and operative surface 32 can be regulated by preferably controlling the flow of the gases exhausting through Coanda nozzles 8A and 8B. The higher the speed of the gases, the greater the suction force generated by the nozzles that is applied to the web 22. The Coanda nozzles function as air clamps for web 22.

The body of air stabilization system 10 further defines a chamber 18A that serves as an opening for Coanda nozzle 8A and a chamber 18B that serves as an opening for Coanda nozzle 8B. Chamber 18A is connected to plenum chamber 40A which in turn is connected to a source of gas 24A via conduit 30A. The gas flow rate into plenum 40A can be regulated by conventional means including pressure controller 28A and flow regulator valve 26A. The length of chamber 40A, as measured along the machine direction, preferably matches that of Coanda nozzle 8A. Plenum 40A essentially serves as a reservoir in which high pressure gas equilibrates before being evenly distributed along the length of Coanda nozzle 8A via chamber 18A. Conduit 30A can include a single channel which connects the source of gas 24A to plenum 40A; alternatively a plurality of holes drilled into the lower surface of the body can be employed. The plurality of holes should be spaced apart along the cross direction of the body in order to distribute gas evenly into plenum 40A.

Similarly, chamber 18B is in gaseous communication with plenum chamber 40B which is connected to a source of gas 24B via conduit 30B. Gas flowing into plenum 40B is regulated by pressure controller 28B and flow regulator valve 26B. The configurations of chamber 40B and conduit 30B are preferably the same as those of chamber 40A and conduit 30A, respectively.

Any suitable gas can be employed in gas sources 24A and 24B, including for example, air, helium, argon, carbon dioxide. For most applications, the amount of gas employed is that which is sufficient maintain of gas flow rate through plenums 40A and 40B at about 2.5 to 7.0 cubic meters per hour (100 to 250 standard cubic feet per hour (SCFH)) and preferably at about 3.6 to 4.2 cubic meters per hour (130 to 150 SCFH). The gas is typically discharged through the Coanda nozzles at a velocity of about 20 m/s to about 400 m/s. By regulating the flow of the gaseous jets exiting Coanda nozzles 8A, 8B, the distance that moving web 22 is maintained above operative surface 32 can be adjusted. The air stabilization system can be employed to support a variety of flexible web products including paper, plastic, and the like. For paper that is continuously manufactured in large scale commercial papermaking machines, the web can travels at speeds of 200 m/min to 1800 m/min or higher. In operation, the air stabilization system preferably maintains the paper web 22 at a distance ranging from about 100 μm to about 1000 μm above operative surface 32.

As illustrated in FIG. 1B, Coanda nozzle 8A has an opening or Coanda slot 66A between upper surface 36A and operative surface 32. Coanda slot 66A has a curved surface 16A on its downstream side. Preferably this surface has a radius of curvature (R) ranging from about 1.0 mm to about 10 mm. Gas flow from Coanda slot 66A follows the cross direction downstream trajectory of the curved surface 16A. Preferably, slot 66A has a width (w) of about 3 mils (76 μm) to 4 about mils (102 μm). The air clamp's suction force draws the web closer to the stabilizer as the web approaches the stabilizer.

Similarly, as shown in FIG. 1C, Coanda nozzle 8B has an opening or Coanda slot 66B between upper surface 36B and operative surface 32. Coanda slot 66B has a curved surface 16B on its downstream side. Gas flow from the Coanda slot 66B follows the cross direction downstream trajectory of the curved surface 16B. The dimensions of structures forming Coanda nozzle 8B can be the as those for Coanda nozzle 8A.

As shown in FIG. 1A, the Coanda nozzles 8A and 8B exhaust jets of gas in opposite directions. The two nozzles are set apart sufficiently to define a planar surface 32 between them. The sheet motion is perpendicular to the forces imparted by the nozzles. The simultaneous opposing forces apply a tension on the moving sheet that creates the desired sheet profile between the nozzles as the sheet passes over the operative surface. With the dual air clamp stabilizers, the paper profile flatness is also maintained in the cross flow direction since the configuration of the surface of the stabilizer is symmetric in this dimension. The higher the air velocities from the dual nozzles, the greater the clamping force generated. With the air stabilization system, by increasing or decreasing the clamping force from the dual nozzles, the distance between moving web 22 and operative surface 32 can be correspondingly decreased or increased.

One advantage is that the paper profile flatness can be scaled arbitrarily in the cross flow direction. Indeed, the dimensions of the air clamp stabilizer can be readily scaled to accommodate the size, weight, speed, and other variable associated with the moving web. Specifically, in particularly for each Coanda nozzle, its (i) slot width (w) and (ii) curvature radius (R) can be optimized systematically for a particular application and can be adapted depending on the properties, e.g., speed and weight, of the web material.

As shown in FIG. 2, the air stabilizing system can be constructed from four basic units that include a central body member 46, upper body member 40, and side supports 42, 44. They are attached together by conventional means including dowels and screws. The generally rectangular-shaped upper body member 46 has outer perimeters 52, 54 that define the inner edges of nozzles 8A and 8B, respectively. A central region 12 has a measurement orifice 48 to accommodate a measurement device. Central body member 46 includes a middle portion 6 and lateral portions 14A and 14B and defines an opening 58 for access to the mounted device within orifice 20. The inward facing edge of lateral portion 14A defines curved surface 16A (FIG. 1B) and the inward facing edge of lateral portion 14B defines curved surface 16B (FIG. 1C). The air stabilizing system is formed by securing upper body member 40 onto central body member 46 so that the upper lateral surfaces 36A and 36B are coplanar with the surface of upper body member 40. Side supports 42 and 44 seal the internal plenums and chambers.

The air stabilization system can be incorporated into on-line dual head scanning sensor systems for papermaking machines which are disclosed in U.S. Pat. No. 4,879,471 to Dahlquist, U.S. Pat. No. 5,094,535 to Dahlquist et al., and U.S. Pat. No. 5,166,748 to Dahlquist, all of which are incorporated herein by reference. The width of the paper in the papermaking machines generally ranges from 5 to 12 meters and typically is about 9 meters. The dual heads, which are designed for synchronized movement, consist of an upper head positioned above the sheet and a lower head positioned below the sheet. The air stabilization system, which is preferably mounted on the lower head, clamps the moving paper to cause it to exhibit an essentially flat sheet profile for measurement.

Figure 3:
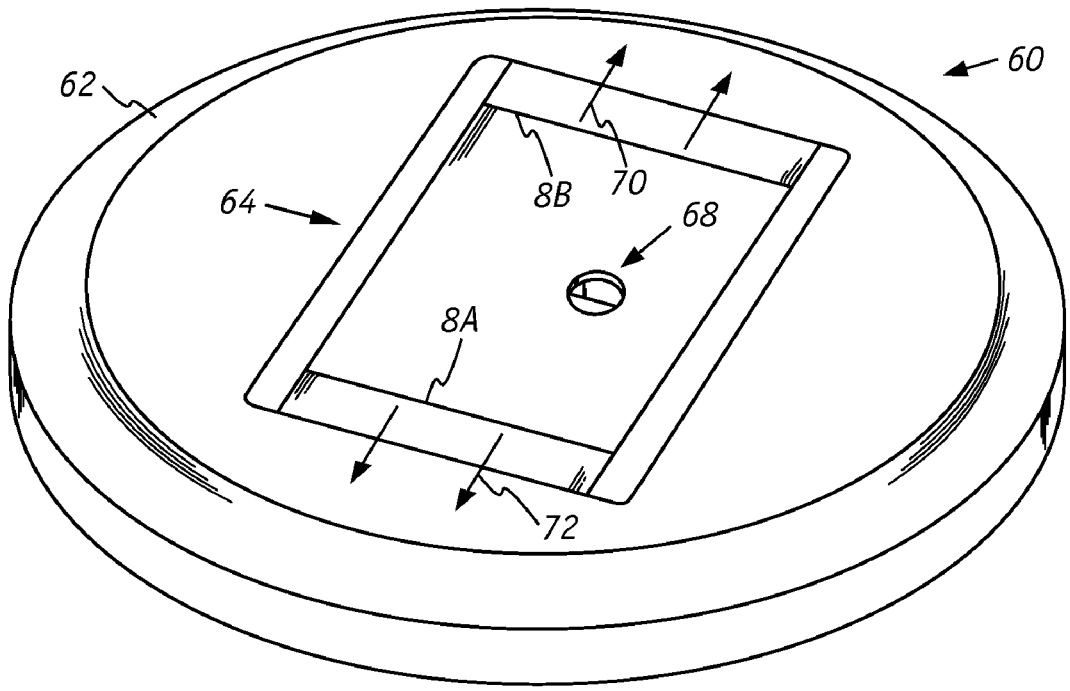
FIG. 3 shows the air stabilizer system as part of a sensor head.

FIG. 3 shows an air stabilization system that is incorporated into a recess compartment within substrate 62 that is part of lower head 60 of a scanning sensor. A measurement device is positioned in measurement orifice 68 between Coanda nozzles 8A and 8B and between the web entry and web exit ends. Substrate 62 is positioned so that a web product travels over the air stabilization system from the web entry end in machine direction 64 which is substantially parallel to the lengths of the elongated Coanda nozzles. Nozzles 8A exhausts jets of gas in its downstream cross direction 72 while nozzle 8B exhausts jets of gas in its downstream cross direction 70, which is in the opposite direction. In operation, substrate 62 scans back and forth along the cross direction to generate measurements of the web along the cross direction. When employed for measuring the caliper of paper, in one embodiment, the distance between nozzles 8A and 8B is about 66 mm and the length of each nozzle along the cross direction is about 57 mm.

Non-contacting caliper sensors such as those disclosed in U.S. Pat. No. 6,281,679 to King et al., which is incorporated herein by reference, include upper and lower heads equipped with laser triangulation devices. The caliper of a moving sheet that travels between the two heads is determined by identifying the positions of the upper and lower surfaces of the sheet with the laser triangulation devices and subtracting the results from a measure of the separation between the upper and lower heads.

Figure 4:
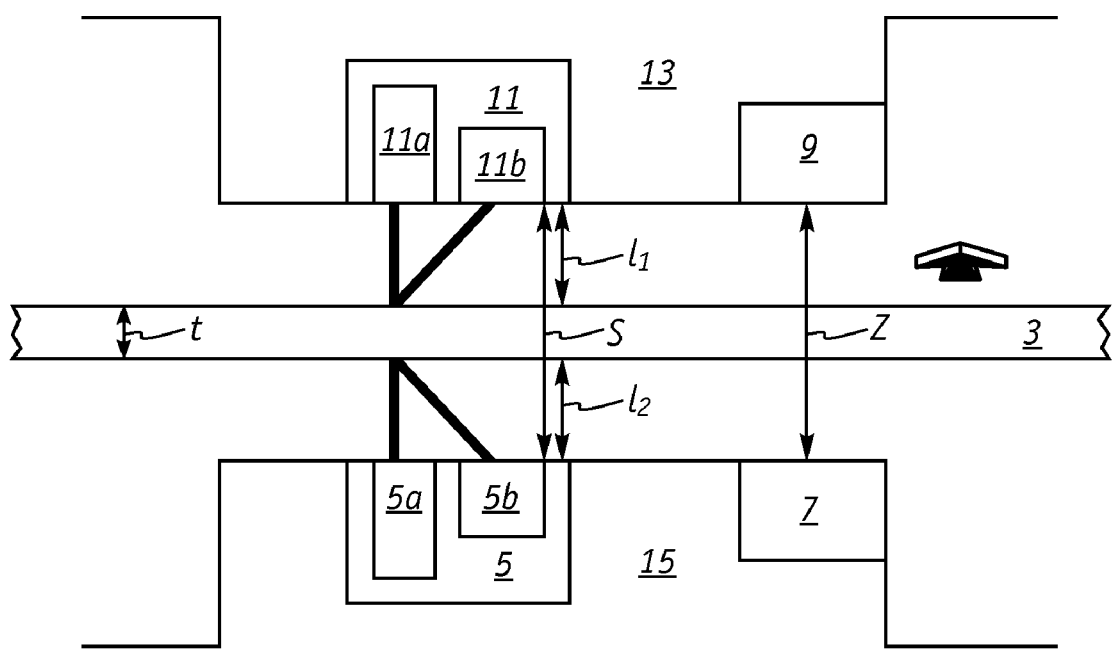
FIG. 4 is a cross sectional schematic view of a caliper measurement device.

FIG. 4 illustrates a representative non-contacting caliper sensor system that includes first and second scanner heads 13 and 15 respectively, which contain various sensor devices for measuring qualities, characteristics, or features of a moving web of material identified as 3. Heads 13 and 15 lie on opposite sides of web or sheet 3, and, if the measurement is to be performed in a scanning manner across the web in the cross direction, the heads are aligned to travel directly across from each other as they traverse the moving web which is moving in the machine direction. A first source/detector 11 is located in first head 13. A second source/detector 5 is located in second head 15. Source/detectors 11 and 5 comprise closely-spaced first and second sources 11b and 5a, respectively, and first and second detectors 11b and 5b, respectively, arranged so that measurement energy from first source 11a and interacting with a first surface of web 3 will return, at least in part to first detector 11b, and measurement energy from second source 5a and interacting with the opposite, or second surface, of web 3 will return, at least in part to second detector 5b.

The source and detector preferably comprise a laser triangulation source and detector, collectively being referred to as an interrogation laser. The source/detector arrangement is referred to generally as a distance determining means. From the measured path length from the source to the detector, values for the distance between each distance determining means and a measurement or interrogation spot on one of the web surfaces may be determined. The heads 13 and 15 are typically fixed in the position so that the interrogations spots do not move in the machine direction even as the heads are scanned in the cross direction.

For first distance determining means 11, the detected distance value between the distance determining means and a first measurement spot on the web surface (referred to as $l_1$) and for second distance determining means 5, the detected distance value between the distance determining means and a second measurement spot on the opposite web surface (referred to as $l_2$). For accurate thickness determinations, the first and second measurement spots (or interrogation spots) are preferably at the same point in the x-y plane, but on opposite sides of the web, i.e. the measurement spots will be separated by the web thickness. In an ideal static situation, the separation, s, between first and second distance determining means 11 and 5 would be fixed, resulting in a calculated value for web thickness, t, of: $t=s-(l_1+l_2)$. In practice, separation s can vary. To correct for this inconstancy in the separation s, a dynamic measurement of the spacing between the scanning heads is provided by a z-sensor means, which measures a distance z, between a z-sensor source/detector 9, located in the first head 13, and a z-sensor reference 7, located in the second head 15.

Because the scanner heads do not retain perfect mutual alignment as a sheet scans between them, the air stabilization system of the present invention is employed to keep the sheet flat so that small head misalignments do not translate into erroneous caliper readings, i.e., caliper error due to head misalignment and sheet angle.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An air stabilization system for non-contact support of a flexible continuous web that is moving in a downstream machine direction (MD) that comprises:
   (a) a body having an operative surface facing the web, wherein the body is segmented into a central region with a central region upper surface, a first lateral region with a first lateral region upper surface and a second lateral region with a second lateral region upper surface, wherein the operative face, which is defined by the central region upper surface, the first lateral region upper surface and the second lateral region upper surface, has a web entry end and a web exit end that is downstream from the web entry end;
   (b) a first nozzle, positioned on the operative surface, that defines a first slot that extends across the surface of the operative surface along the MD and wherein a first elongated jet of pressurized gas is exhausted through the first slot and moves toward a first cross direction to impart a first controlled force on the web wherein the first slot has a first elongated opening at a first surface of the body wherein the first elongated opening is formed between the central region and the first lateral region, and has a first curved convex surface at the first elongated opening on its downstream side; and
   (c) a second nozzle, positioned on the operative surface, that defines a second slot that extends across the surface of the operative surface along the MD, wherein a second elongated jet of pressurized gas is simultaneously exhausted through the second slot and moves toward a second cross direction to impart a second controlled force on the web, wherein the second slot has a second elongated opening at a second surface of the body wherein the second elongated opening is formed between the central region and the second lateral region and has a second curved convex surface at the second elongated opening on its downstream side, wherein the direction of the first cross direction is perpendicular to the MD and opposite that of the second cross direction and whereby the first force and the second force maintain at least a portion of the moving web, that is located between the web entry end and the web exit end, at a substantially fixed distance to the operative surface, wherein the operative surface between the first slot and second slot defines a continuous planar surface and wherein the central region upper surface, the first lateral region upper surface and the second lateral region upper surface are coplanar so that the central region upper surface is substantially flush with the first lateral region upper surface and the central region is substantially flush with the second lateral region upper surface.

2. The system of claim 1 wherein the first slot is in fluid communication with a first source of gas and wherein the second slot is in fluid communication with a second source of gas.

3. The system of claim 2 wherein the distance between the first elongated opening to the second elongated opening ranges from about 3.3 to 10 cm.

4. The system of claim 1 comprising means for independently controlling the flow of the first elongated jet and the flow of the second elongated jet.

5. The system of claim 4 wherein the flow rate of the first elongated jet as it is exhausted from the first slot ranges from 2.5 to 7.0 cubic meters per hour and the flow rate of the second elongated jet as it is exhausted from the second slot ranges from 2.5 to 7.0 cubic meters per hour.

6. The system of claim 1 wherein the first slot has a length as measured along the CD that ranges from 2.9 to 8.6 cm and the second slot has a length as measured along the CD that ranges from 2.9 to 8.6 cm.

7. The system of claim 1 wherein the web comprises paper.

8. A system for monitoring a flexible continuous web that is moving in a downstream machine direction (MD) that comprises:
  (a) an air stabilization system for non-contact support of the flexible continuous web, which has a first surface and a second surface, that comprises:
    (i) a body having an operative surface facing the web, wherein the body is segmented into a central region with a central region upper surface, a first lateral region with a first lateral region upper surface and a second lateral region with a second lateral region upper surface, wherein the operative face, which is defined by the central region upper surface, the first lateral region upper surface and the second lateral region upper surface, has a web entry end and a web exit end that is downstream from the web entry end;
    (ii) a first nozzle, positioned on the operative face, that defines a first slot that extends across the surface of the operative surface along a MD and wherein a first elongated jet of pressurized gas is exhausted through the first slot and moves toward a first cross direction to impart a first controlled force on the web wherein the first slot has a first elongated opening at a first surface of the body wherein the first elongated opening is formed between the central region and the first lateral region, and has a first curved convex surface at the first elongated opening on its downstream side; and
    (iii) a second nozzle, positioned on the operative face, that defines a second slot that extends across the surface of the operative surface along the MD, wherein a second elongated jet of pressurized gas is simultaneously exhausted through the second slot and moves toward a second cross direction to impart a second controlled force on the web, wherein the second slot has a second elongated opening at a second surface of the body wherein the second elongated opening is formed between the central region and the second lateral region and has a second curved convex surface at the second elongated opening on its downstream side, wherein the direction of the first cross direction is perpendicular to the MD and opposite to that of the second cross and whereby the first force and the second force maintain at least a portion of the moving web, that is located between the web entry end and the web exit end, at a substantially fixed distance to the operative surface, wherein the operative surface between the first slot and second slot defines a continuous planar surface and wherein the central region upper surface, the first lateral region upper surface and the second lateral region upper surface are coplanar so that the central region upper surface is substantially flush with the first lateral region upper surface and the central region is substantially flush with the second lateral region upper surface;
  (b) a first sensor head that is disposed adjacent the first surface of the web; and
  (c) means for regulating the flow rate of the first jet of gas and the flow rate of the second jet of gas to control the web's profile along the process path over the operative surface.

9. The system of claim 8 wherein the first sensor head is disposed within the body such that an active surface of the first sensor head is flushed with the central region upper surface and the system further comprises (d) a second sensor head that is disposed adjacent the second surface of the web.

10. The system of claim 9 wherein the first sensor includes means for measuring the distance between the first sensor and the first surface and the second sensor includes means for measuring the distance between the second sensor and the second surface and wherein the system further includes means for measuring the distance between the first sensor and the second sensor.

11. The system of claim 9 comprising means for scanning the first and second sensor heads back and forth along the cross direction.

12. The system of claim 9 wherein the distance between the first slot to the second slot ranges from about 3.3 to 10 cm.

13. The system of claim 9 comprising means for independently controlling the flow of the first elongated jet and the flow of the second elongated jet.

14. The system of claim 9 wherein the first and second sensor heads comprise means for measuring the thickness of the web.

15. The system of claim 8 wherein the first slot is in fluid communication with a first source of gas and wherein the second slot is in fluid communication with a second source of gas.

16. The system of claim 8 wherein the web comprises paper.

* * * * *